Dec. 20, 1960 J. C. ALRICH 2,965,297

FLOATING POINT ARITHMETIC COMPARISON CIRCUIT

Filed Aug. 8, 1957 2 Sheets-Sheet 1

INVENTOR.
JOHN C. ALRICH

BY Christie, Parker & Hale
ATTORNEYS.

Dec. 20, 1960 J. C. ALRICH 2,965,297

FLOATING POINT ARITHMETIC COMPARISON CIRCUIT

Filed Aug. 8, 1957 2 Sheets-Sheet 2

INVENTOR.
JOHN C. ALRICH

BY

Christie, Parker & Hale
ATTORNEYS.

United States Patent Office 2,965,297 Patented Dec. 20, 1960

2,965,297

FLOATING POINT ARITHMETIC COMPARISON CIRCUIT

John C. Alrich, Altadena, Calif., assignor to Burroughs Corporation, Detroit, Mich., a corporation of Michigan Filed Aug. 8, 1957, Ser. No. 677,042
6 Claims. (Cl. 235—157)

This invention relates to computing apparatus and more particularly to a circuit for use in computing apparatus where floating point arithmetic operations are involved.

In the field of computing machinery the demand for greater speed of operation has given rise to the use of high speed components and systems having great flexibility. In some instances where speed is derived by using precision-built components, an increase in cost of manufacture results, and in instances where speed is secured by designing flexibility into a system, the outcome in many instances is an increase in the number of components, resulting in additional costs.

According to the present invention a reduction in computing time may be secured where floating point multiplication and division is involved and it can be predetermined that the correct answer must be zero. If either a multiplicand or a multiplier is zero, the product is zero, but a quotient may be said to be zero without qualification only when the dividend is zero and the divisor is something other than zero. When either of the foregoing situations arises a zero may be inserted in the answer register and the divide or multiply instruction or order may be terminated and the next one initiated. In floating point multiplication or division, the presence of either of the foregoing conditions can be determined by inspecting one digit in the multiplier for zero and one digit in the multiplicand for zero in multiplication operations, or by inspecting one digit in the dividend for zero and one digit in the divisor for a value other than zero during divide operations. As demonstrated subsequently, these digits are the most significant digit in the mantissa of the two operands concerned. Thus a short cut to the correct answer may be effected and computer time saved.

In computing devices where floating point arithmetic is employed, the operands usually include one portion which comprises information denoted as the mantissa and another portion termed the exponent. Such machines designed for general purpose applications normally include one digit of the operand to indicate a plus or minus sign. The location of the sign, exponent and mantissa within the various digits of a register varies according to the original design of existing machines, and the number of digits allocated to the exponent and mantissa is determined by the number of digits in the operand. Although the present invention is applicable to straight binary, decimal, a coded combination of the two, or other system of enumeration, assume for purposes of illustration that a decimal system of notation is used with an operand of eleven digits. Let it be assumed further that the leftmost digit is reserved for sign, the second and third digits from the left are reserved for the exponent to the base 10, and the eight digits on the right represent the mantissa. The decimal point may be said to lie between the third and fourth digits from the left. Assuming the sign is plus for zero and minus for all other values, the true value of the operand 00112340000 is $+1.234$, but as it occurs in the machine it is denoted as $+.1234\times10^1$.

In order to avoid the problem of keeping track of a plus or a minus sign for the exponent, it is sometimes customary to add a constant to the exponent sufficient in value that a negative exponent, for a given computer, does not exceed the constant. In this manner it is easy to determine the value of the exponent before a print-out operation merely by subtracting the constant from the exponent, thereby avoiding the problem of maintaining control of the sign of the exponent during computation. If a constant of fifty is assumed in the present example and this is added to the exponent, the value of the exponent in the machine then becomes fifty-one. Before readout, the constant of fifty is subtracted and an exponent of one is properly determined.

From the foregoing explanation it is readily seen thata the following operands in the lefthand column, as they appear in a computer, are equal to the values indicated to the right:

$$05112340000 = +.1234\times10^1 = +1.234$$
$$15312340000 = -.1234\times10^3 = -123.4$$
$$04812340000 = +.1234\times10^{-2} = +0.001234$$
$$00000000000 = \text{------}\times\text{-----}\quad +0.0000000000$$

These examples serve to illustrate one type of word format including sign, exponent and mantissa. It is to be understood, however, that the arrangement is subject to modification as to the order in which these values appear and that the number of digits for either the exponent or the mantissa may be increased or diminished as needed.

From the above examples it follows by definition that if the fourth digit from the left is zero, the value of the number is likewise zero. Whenever two numbers are multiplied, the product is zero if either the multiplicand or the multiplier is zero. In the process of division, it is likewise true that the quotient is zero if the dividend is zero and the divisor is not zero. Accordingly, when the fourth digit from the left of one of the foregoing operands is zero and the operand is a dividend, multiplier or multiplicand, the product or the quotient, as the case may be, is zero. Since the process of multiplication or division is normally time consuming, a realization of a decrease in computing time may be secured by inhibiting the routine sequence of computer operations for a given multiply or divide operation when it can be determined at the outset of such an instruction or order that the product or quotient is zero.

The amount of computing time saved by means of the present invention is determined by the frequency of occurrence of the value zero in the multiplicand or multiplier during multiply operations and the frequency of occurrence of the value of zero in the dividend and something other than zero in the divisor of a division problem. These conditions occur at random in many types of problems. The rate at which they occur is not infrequent in many instances. In matrix multiplication problems, for example, a substantial saving in computer time may be obtained where, as is frequently the case, zero as a multiplier or product appears quite often.

Accordingly it is a feature of the present invention to sample the most significant digit in the mantissa of a multiplier and a multiplicand operation during a floating point multiplication problem. If a zero is found in either instance, the correct answer is zero. Accordingly the floating point multiplication instruction may be terminated, the next instruction initiated and the correct answer of zero established in the register where the answer is stored by merely clearing this register. A decrease in computing time is secured by inhibiting further operations of the particular instruction or order.

It is a feature of the present invention to examine the most significant digit in the mantissa of a dividend operand for a zero and the most significant digit in the mantissa of a divisor for the presence of a number other than zero. If both conditions are met during a floating point division instruction or order, the correct answer of zero may be established in the register where the answer is stored by merely clearing this register, the present instruction may be terminated and the next instruction initiated. Further operations of the particular floating point division instruction or order may be inhibited, resulting in a decrease in computer time.

According to the present invention operands stored as signals in first and second registers are examined by inspecting the most significant digit of each mantissa in floating point operations involving multiplication and division. If a zero is detected in either the multiplier or multiplicand of a multiplication instruction or order, a control signal may be generated which operates a control device adapted to inhibit further arithmetic operations of that particular order or instruction. If a zero is not detected, the computer control device is not inhibited but proceeds in its normal fashion to carry out the present instruction. Whenever a zero is detected in the most significant digit of the mantissa of a dividend and a value other than zero is detected in the most significant digit of the mantissa of a divisor during a division instruction or order, a control signal may be generated and supplied to a control device adapted to inhibit further arithmetic operations during the floating point division instruction or order. If a control signal is not generated, the computer control device is not inhibited, but continues to generate the normal commands for the floating point division operation.

These and other features of this invention may be more fully appreciated when considered in the light of the following specification and drawings in which.

Figure 1:
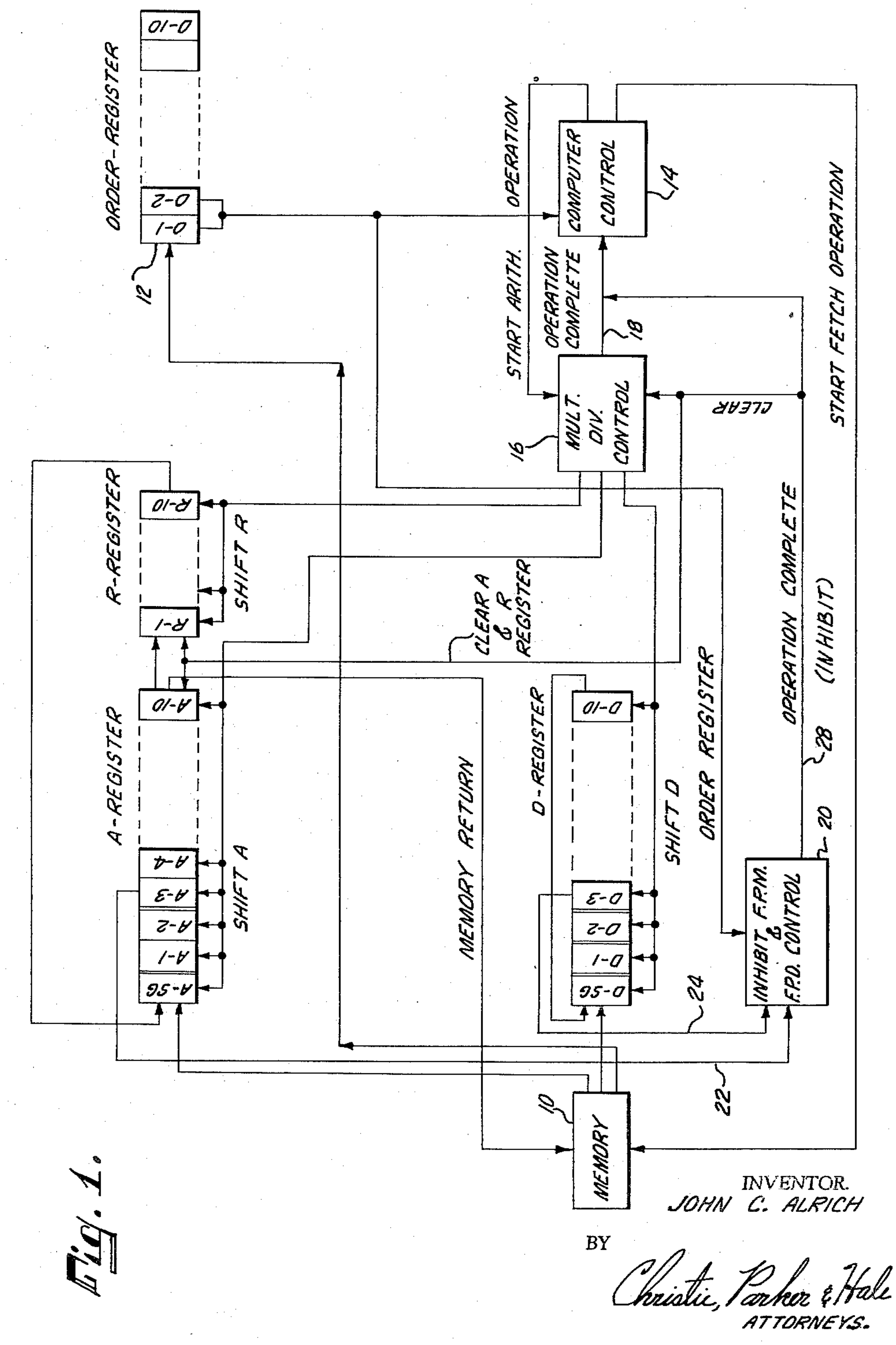
Fig. 1 is a block diagram showing an organization of the type in which this invention may be employed.

Reference is made to Fig. 1 which shows in block schematic form an environmental organization of the type in which the present invention may be used. An A-register and a D-register may be supplied with information in the form of operands from a memory device 10. The particular instruction or order such as add, subtract, multiply, divide, etc., which is to be performed upon the operands is determined by information in an order register 12 which may also receive its information from the memory device 10. A computer control 14 responds to the information in the order register 12 to generate individual command pulses in an orderly fashion to execute the instruction or order supplied as information to the order register 12. One of the functions of the computer control 14 is to start a multiply-divide control 16 which in turn supplies individual pulses to the A-register, D-register and R-register in an orderly manner for executing multiply or divide operations. When the multiply-divide control 16 has sequenced through its normal course in executing a multiply or divide operation, a pulse is generated on line 18 and supplied to the computer control 14 for the purpose of indicating to the computer control 14 that the multiply or divide operation is complete. The computer control may then initiate the next instruction. An R-register is provided for storing, among other things, the product or quotient as it is generated.

Each of the foregoing elements illustrated in block form in Fig. 1 may be of conventional construction of various types known in the art. Furthermore an illustration and a description of these elements is not essential to an understanding of the present invention and in the interests of simplicity no further discussion of these elements is made herein. The subsequent discussion is directed more particularly to the Inhibit Floating Point Multiply and Floating Point Divide Control block 20, abbreviated Inhibit F.P.M. and F.P.D. Control, which includes the improvement of the present invention.

The Inhibit F.P.M. and F.P.D. Control 20 receives information from the most significant digit order of the mantissa in the A-register (A–3) on a line or cable 22 and information from the most significant digit of the mantissa in the D-register (D–3) on a line or cable 24. Information from the order register 12 is supplied to the Inhibit F.P.M. and F.P.D. Control 20 to indicate that a floating point multiply or a floating point divide operation is held in the order register. With the information thus received the Inhibit F.P.M. and F.P.D. Control 20 is capable of determining whether or not the quotient or the product must be zero. If the product or quotient must be zero, then a signal is established on a line 28 which may be supplied to control elements 14 and 16 to inhibit the present multiply or divide floating point instruction or order and initiate the next instruction; this signal is also used to clear the A-register and R-register since this is where the answer is stored which in such cases is zero.

Figure 2:
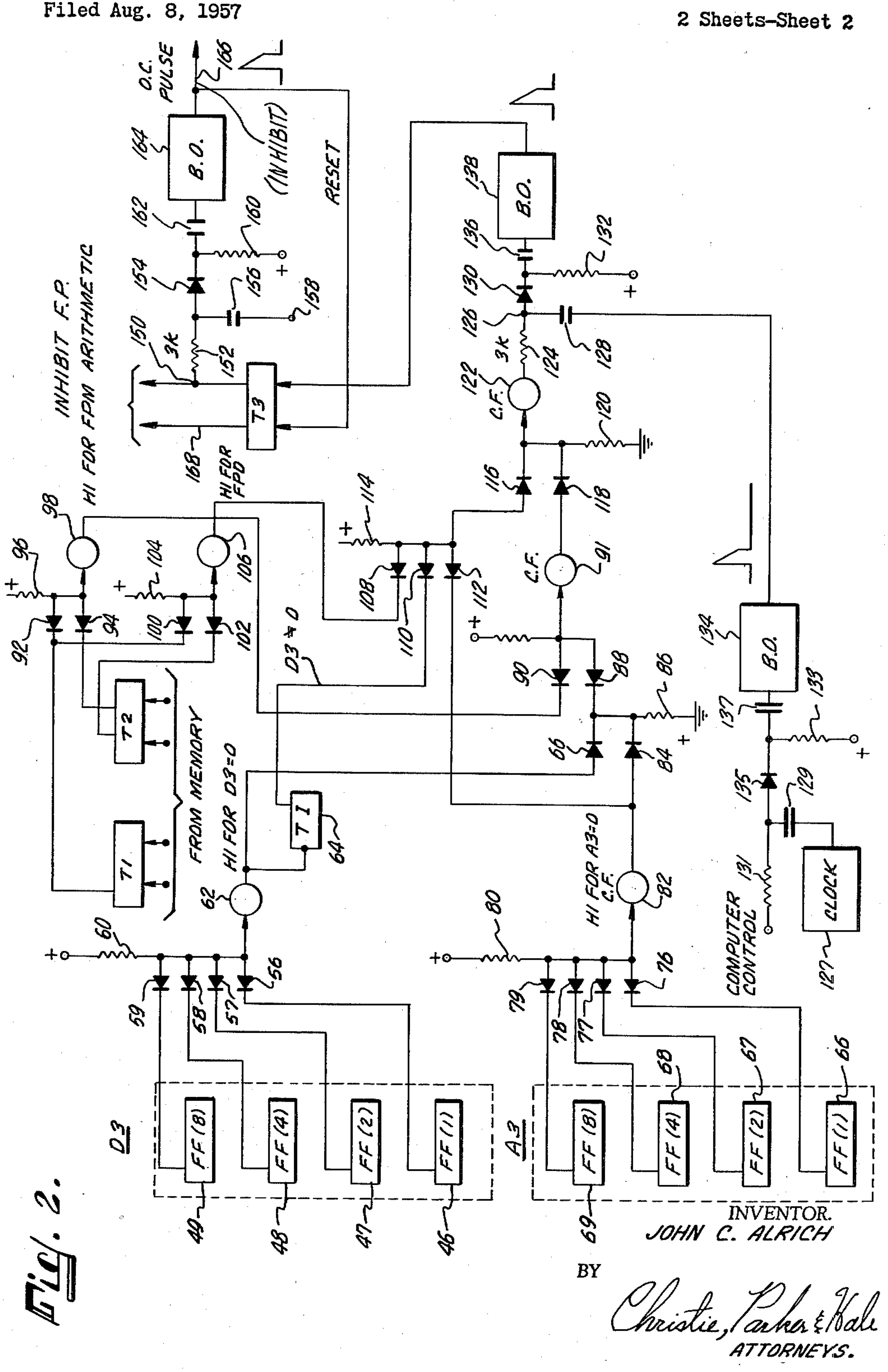
Fig. 2 is a circuit schematic showing in detail one arrangement according to the present invention.

Reference is made to Fig. 2 which shows an electrical circuit diagram of the Inhibit F.P.M. and F.P.D. Control 20 of Fig. 1. The stage A–3 of the A-register and the stage D–3 of the D-register, the most significant digit of the mantissa in each register, in Fig. 1 are shown in Fig. 2 within the respective dotted line blocks 40 and 42. As illustrated, each stage utilizes a binary coded decimal representation including four toggles. Whenever the stage D–3 indicates zero the output from each of the toggles 46–49 to respective diodes 56–59 is high. The diodes 56–59 and a resistor 60 constitute an AND circuit. When all the inputs to the diodes 56–59 are high, the output signal to a cathode follower 62 is high, and the output from the cathode follower 62 to a toggle inverter 64 and a diode 66 is high. Whenever any one of the toggles 46–49 presents an output which is low, a low signal output is supplied to the cathode follower 62 which in turn supplies a low signal output to toggle inverter 64 and the diode 66. A low output signal from any one of the toggles 46–49 indicates that the stage D–3 is not zero.

In a similar fashion toggles 66–69 of the A–3 stage of the A-register supply a high signal level to the respective diodes 76–79 whenever a zero is indicated in this stage. The diodes 76–79 in conjunction with resistor 80 perform as an AND circuit to supply a high signal level to a cathode follower 82 which in turn is supplied to a diode 84 whenever the A–3 stage indicates zero. If any one of the toggles 66–69 of the A–3 stage is not zero, a low signal level is supplied to the corresponding ones of the diodes 76–79, and a low output signal level is supplied to the cathode follower 82 and then to the diode 84.

The diodes 66 and 84 and the resistor 86 constitute an OR circuit. If either of these diodes receives a high input signal, then a high input signal is conveyed to diode 88. The diodes 88 and 90 constitute an AND circuit. A high signal input is applied to the diode 90 whenever a floating point multiply operation is prescribed.

Toggles T1 and T2 control the signal level supplied to the diode 90. Whenever the output from toggle T1 to diode 92 is high and the output of toggle T2 to the diode 94 is high, these two diodes and a resistor 96 function as an AND circuit to provide a high output signal to cathode follower 98 which in turn supplies a high output signal to the diode 90. The signal levels provided by the toggles T1 and T2 to the diodes 92 and 94 are made high if a floating point multiply is to be performed.

Whenever the output from the toggle T1 to the diode 100 is high and the output from toggle T2 to the diode 102 is high, these diodes in conjunction with a resistor 104 function as an AND circuit to provide a high output signal to cathode follower 106 which in turn supplies a high output signal to a diode 108. A high output signal is provided by the toggles T1 and T2 to the respective diodes 100 and 102 whenever a floating point divide operation is prescribed.

Thus it is seen that the toggles T1 and T2 are set as indicated whenever floating point multiply or floating point divide operations are prescribed. These toggles may in practice constitute a portion of the order register 12 in Fig. 1, and they may be set in the appropriate conditions with information signals from the memory device 10 in Fig. 1.

Whenever the diode 108 receives a high input signal from cathode follower 106, diode 110 receives a high input signal from the toggle inverter 64, and a diode 112 receives a high input signal from the cathode follower 82, the diodes 108, 110 and 112 in conjunction with a resistor 114 serve as an AND circuit to supply a high output signal to a diode 116. The diode 116, diode 118 and resistor 120 perform as an OR circuit so that if a high input signal is applied to either diode 116 or diode 118 a high output signal is supplied to cathode follower 122. The output of the cathode follower 122 is supplied to a resistor 124 which in turn is connected to the junction point 126. A condenser 128 and a diode 130 are connected to the junction point 126. A source of positive potential is connected through a resistor 132 to the opposite side of the diode 130. The resistor 124, condenser 128 and diode 130 serve as a gate circuit to permit a positive pulse from a blocking oscillator 134 to the condenser 128 to pass through the diode 130 if a high signal level is provided from the output of the cathode follower 122 to the resistor 124. A pulse from the blocking oscillator 134 is not passed by the diode 130 if the output from the cathode follower 122 is low. A pulse passed by the diode 130 is coupled through a condenser 136 to a blocking oscillator 138. Pulses from a clock 127 are supplied through a condenser 129 to the junction point of a resistor 131 and a diode 135. A signal level is supplied to the resistor 131 whenever floating point multiply or divide operations are being performed. This control level may be provided by the computer control element 14 in Fig. 1, or it may be provided by the cathode followers 98 and 106 through a suitable OR circuit, not shown, to the resistor 131. A positive level is supplied through a resistor 133 to one side of the diode 135. When the level supplied to the resistor 131 is high, the potential at the junction point of the resistor 131 and the diode 135 goes high, and positive pulses from the clock 127 are passed by the diode 135 through a condenser 137 to the blocking oscillator 134. When the level supplied to the resistor 131 is low, the potential at the junction of the resistor 131 and the diode 135 is low, and positive pulses from the clock 127 are not passed by the diode 135. Thus it is seen that the blocking oscillator 134 receives clock pulses whenever floating point multiply or divide operations are prescribed. In response to an input pulse, the blocking oscillator 138 supplies an output pulse to the toggle T3 which sets the toggle T3 so that output conductor 150 goes high. Whenever the output signal on the conductor 150 is high the gate circuit formed by resistor 152, diode 154 and condenser 156 will pass a positive pulse supplied to input terminal 158. Pulses supplied to the terminal 158 may be taken from the clock 127 or other suitable pulse source. A positive source is connected through resistor 160 to the diode 154 and serves the same purpose as the positive source connected to resistor 132 for blocking oscillator 138. Positive pulses coupled through condenser 162 to blocking oscillator 164 cause operation complete pulse (o.c. pulse) to be established on line 166. This pulse is also coupled back to the input of the toggle T3 to reset it to the opposite state, making the signal level low on the output conductor 150 and the signal level high on the output conductor 168.

The pulse generated on output conductor 166 indicates that the present floating point multiply or divide operation may be terminated because the product or quotient is zero. This pulse, indicated in Fig. 1 as an operation complete pulse on line 28, is used to clear the A-register and R-register because this is where the quotient or product is stored which in this instance is zero. This pulse also applies to the multiply-divide control 16 and the computer control 14 in Fig. 1 to terminate the present instruction or order and to initiate the next instruction or order prematurely.

Within each computer there is normally generated at some place within the machine a signal which effectively signifies the end of the present order or instruction and serves to initiate the succeeding order or instruction. It is a straightforward matter to determine in a given machine the place where such a signal is generated and to connect the output line 166 in Fig. 2 to such point in a given computer when the apparatus of the present invention is incorporated therein.

The blocking oscillators, cathode followers and toggles shown in block form in Fig. 2 may be any one of many well known varieties.

For the purpose of illustrating the operation of the circuit in Fig. 2, assume that the D-register in Fig. 1 holds a multiplicand operand, the A-register in Fig. 1 holds a multiplier operand and a floating point multiply operation is prescribed. If the stage A–3 holds a zero, the diodes 76–79 in Fig. 2 are supplied with a high signal level, and because these diodes form an AND circuit, a high signal level is supplied through the cathode follower 82 to the diode 84 of the associated OR circuit. If the stage D–3 in Fig. 1 holds a zero, a high signal level is supplied to each of the diodes 56–59 in Fig. 2, and because they form an AND circuit, a high signal level is supplied through the cathode follower 62 to the diode 66. Since the diodes 66 and 84 are included in an OR circuit, either a zero in the A–3 stage or a zero in the D–3 stage causes a high signal level to be supplied to the diode 88. The toggles T1 and T2 are set to supply high signal level outputs to the diodes 92 and 94 when a floating point multiply operation is prescribed. Because they serve as an AND circuit, these diodes in turn supply a high signal level through the cathode follower 98 to the diode 90.

When both diodes 88 and 90 receive a high signal level input, a high signal level is supplied through the cathode follower 91 to the diode 118. Because the diodes 116 and 118 perform as an OR circuit the high signal level to the diode 118 is conveyed to the cathode follower 122 which in turn provides a high signal level as an output which raises the signal level at the junction point 126.

When a floating point multiply operation is prescribed, a high signal level is supplied to the resistor 131, and pulses from the clock 127 to the diode 135 are passed to the blocking oscillator 134 which in turn supplies positive pulses through a condenser 128 to the junction point 126. Since the potential at the junction point 126 is high, the first pulse from the blocking oscillator 134 is passed by the diode 130 and condenser 136 to the blocking oscillator 138. This blocking oscillator in turn generates a pulse which is supplied to the toggle T3, causing the output potential on the output conductor 150 to go high. The potential at the junction point of resistor 152 and condenser 156 is raised, and the next clock pulse supplied to the terminal 158 is passed through diode 154 and condenser 162 to the blocking oscillator 164. The blocking oscillator 164 generates a pulse on output conductor 166 which resets the toggle T3. In addition, this output pulse is conveyed as an operation complete pulse to the multiply-divide control 16 in Fig. 1, to the computer control 14 and to the A- and R-registers for the purpose of clearing them. These registers are cleared because this is where the final answer is located, which in this instance is zero.

It is pointed out that pulses from the clock 127 to the blocking oscillator 134 are conveyed through the diode 130 and condenser 136 to the blocking oscillator 138, and this blocking oscillator sends pulses to the toggle T3 which in turn operates the blocking oscillator 164, supplying a pulse on the output conductor 166 and resetting the toggle T3. This sequence may continue to recur until the computer terminates the present floating point multiply instruction or order. When the present floating point multiply instruction is terminated, the signal level supplied to the resistor 131 is brought to a low level, and this prevents further passing of pulses from the clock 127 to the blocking oscillator 134 which consequently prevents operation of the blocking oscillator 138, the toggle T3 and the blocking oscillator 164. Alternatively, if pulses are passed by the blocking oscillator 134, they may be prevented from passing through the diode 130 if the toggles T1 and T2 are cleared and the signal level applied to the diode 90 falls to a low level. In this case, the blocking oscillator 138, the toggle T3 and the blocking oscillator 164 are not operated because the signal level from cathode follower 122 to the junction point 126 is low and pulses from the blocking oscillator 134 do not pass through to the blocking oscillator 138. It is seen, however, that until the computer control supplies a low level to resistor 131 or until toggles T1 and T2 are cleared and a low level is supplied to the diode 90, a series of pulses from the blocking oscillator 164 may be generated on the output conductor 166. This gives an added measure of assurance that the present floating point multiply order will be terminated, and until it is terminated, operation complete pulses are generated on the conductor 166.

For the purpose of illustrating the operation of the circuit in Fig. 2 during a floating point divide operation, assume that a dividend operand is placed in the A-register of Fig. 1, a divisor operand is placed in the D-register, and a floating point divide operation is prescribed. If the A–3 stage of the A-register, the most significant digit of the mantissa, is zero, and the D–3 stage of the D-register is not zero, it can be accurately predicted that the quotient is zero. Accordingly, the floating point divide instruction or order may be terminated and the correct quotient inserted in the A-register by clearing this register, the proper answer in this case being zero.

When the A–3 stage holds a zero during a floating point divide operation, each of the diodes 76–79 in Fig. 2 is supplied with a high signal level which in turn is supplied through the cathode follower 82 to the diode 112. The toggles T1 and T2 are set during a floating point divide operation to supply high output signal levels to the diodes 100 and 102. Because these diodes function as an AND circuit, they convey a high signal level through the cathode follower 106 to the diode 108. If the D–3 stage does not hold a zero, at least one of the diodes 56–59 will receive a low signal level. Since these diodes perform as an AND circuit, the output signal to the cathode follower 62 is a low signal level. The toggle inverter 64 responds to the low signal level on its input to provide a high signal level on its output to the diode 110. The diodes 108, 110 and 112, each receiving a high signal level input, perform as an AND circuit, and accordingly they provide a high signal level output to the diode 116 to the cathode follower 122 which in turn supplies a high signal level on its output and raises the potential at the junction point 126.

The toggle inverter 64 and the diode 110 serve a special purpose which should be noted at this point. If the dividend in the A-register is zero and the divisor in the D-register is zero, the quotient is indeterminate. A division of zero by bero is a non-permissible and undefined arithmetic operation. Accordingly, it is desirable with the circuits in Fig. 2 to prevent the establishing of a zero quotient whenever the dividend and divisor are both zero. The toggle inverter 64 and the diode 110 help to accomplish this result. The diode 110 receives a low signal level from the toggle inverter 64 if, and only if, the output signal level from the cathode follower 62 to the toggle inverter 64 is high. The output signal level of the cathode follower 62 is high if, and only if, all the toggles 46–49 provide a high output signal to respective diodes 56–59, indicating a value of zero. As previously pointed out, these diodes constitute an AND circuit which provides a low signal level output only when any one of the inputs receive a low signal level.

Several other possible division problems should be mentioned although they present no difficulty. In the case where the dividend in the A-register is not zero and the divisor in the D-register is zero, it may be said that the true answer is infinity. The circuit in Fig. 2 inhibits the setting of a zero in the A-register and R-register, where the answer is kept, for two reasons: First, the divisor in the D-register being zero, the output from each of the toggles 46–49 in the D–3 stage is high, and the diodes 56–59 supply a high signal level through the cathode follower 62 to the toggle inverter 64, which in turn supplies a low signal level to the diode 110. Second, the dividend in the A-register being something other than zero, at least one of the toggles 66–69 in the A–3 stage supplies a low signal level to a respective one of the diodes 76–79, and a low output signal level is supplied through the cathode follower 82 to the diode 112. A low signal level to either the diode 110 or the diode 112, both being present in the assumed situation, is sufficient to prevent the inhibition of the present divide instruction or order because the AND circuit including the diodes 108, 110 and 112 provides a low signal level output to the diode 116.

In the event that the dividend in the A-register and the divisor in the D-register is something other than zero, this is a case where it is desirable not to inhibit the divide operation. It is easily seen that although the diode 110 is supplied with a high signal level because the stage D–3 is not zero, the diode 112 is supplied with a low signal level because the A–3 stage does not hold a zero. Consequently, the present instruction is not inhibited.

In the case where the dividend in the A-register is zero and the divisor in the D-register is not zero, the quotient in such case is zero, and the circuit in Fig. 2 operates in cases of this type to inhibit the divide instruction or order, to initate the subsequent order, and to clear the A- and R-register where the answer is kept, thereby establishing the answer of zero.

During a floating point divide operation where the stage A–3 contains a zero and the stage D–3 does not contain a zero, high signal levels are supplied as inputs to the diodes 108, 110 and 112. Since they are connected as an AND circuit, a positive signal level is conveyed to the diode 116, then to the cathode follower 122 and then applied through the resistor 124 to the junction point 126. Pulses from the clock 127 to the diode 135 are passed to the blocking oscillator 134 during a floating point divide operation because a high signal level is applied to the resistor 131 by the computer control.

The pulses from the blocking oscillator 134 are passed by the diode 130 to the blocking oscillator 138 which operates the toggle T3 and the blocking oscillator 164 in the manner previously explained with respect to the floating point multiply operation to cause operation complete pulses to be generated on output conductor 166. Like the floating point multiply operation, these pulses clear the A- and R-register where the quotient is located. In addition they are applied to the multiply-divide control 16 and computer control 14 in Fig. 2 until the computer control supplies a low signal level to the diode 131 in Fig. 2 or until the toggles T1 and T2 are reset so that a low signal level is supplied to the diode 108, then to the diode 116 and the cathode follower 122 to the junction point 126. After either of these operations is effected, no further operation complete pulses on the output conductor 166 are generated. This signifies that the next instruction or order has been initiated.

In computing devices where a straightforward binary system of representation is employed, a single toggle for the most significant digit of the mantissa may replace the four toggles illustrated in Fig. 2 for the D–3 stage or the A–3 stage. In such a straightforward binary system the need for the AND circuit including the diodes 56–59 and the resistor 60 and the AND circuit including the diodes 76–79 and the resistor 80 may be eliminated. The single toggle in a straightforward binary system of representation may have its output conductor connected directly to the cathode follower 62 in the case of the D–3 stage or the cathode follower 82 in the case of the A–3 stage. The remainder of the circuit in Fig. 2 may perform during floating point multiply or divide operations in the manner previously explained.

Accordingly it is seen that this invention is inexpensive to construct and mantain because of its simplicity and relatively small number of component parts. It is easily adapted to existing machines and may be incorporated by design in new machines which employ floating point multiply or divide instructions or orders. It affords a substantial saving in computer time whenever a product or quotient can be predetermined to be zero, especially in problems involving matrix multiply and the like.

I claim:

1. A circuit for use in computing systems capable of multiplication and division by floating arithmetic point including individual registers each having a plurality of storage positions for storing signals representative of operands arranged in a floating arithmetic point format, another register for storing signals specifying a multiplication or division operation on the signals stored in said first mentioned registers, and individual circuit means coupled to be responsive to a preselected combination of the signals stored in the storage position for each of said individual registers representative of the most significant digit of the operands and separately responsive to said preselected combination with the multiplication or division signal to initiate an output signal to the computing system representative of a completed operation only when the stored signals are indicative of a product or quotient of zero.

2. A circuit for use in a computing machine having an arithmetic unit capable of division by floating point arithmetic, including a first register having a plurality of stages in which signals are stored representative of a dividend, a second register having a plurality of stages in which signals are stored representative of a divisor, a control means responsive to signals stored in a predetermined stage of said first register and signals stored in a predetermined stage of said second register for providing an output signal of a predetermined level when the signals in the predetermined stage of said first register represent zero and the signals in the predetermined stage of said second register are not zero, means responsive to said output signal of said control means for generating pulses adapted to inhibit further arithmetic operations and establish the correct quotient of zero.

3. A device for use during multiplication and division operations in computing apparatus where floating point arithmetic is involved, including first and second registers each having a plurality of stages, first means coupled to predetermined stages of said first and second registers for providing an output signal during a multiplication operation effective as a control signal when signals stored in the predetermined stage of said first register or signals stored in the predetermined stage of said second register are indicative of a product equal to zero, said means providing an output signal effective as a control signal during a division operation whenever signals stored in the predetermined stage of said first register are representative of a dividend equal to zero and the signals stored in the predetermined stage of said second register are representative of a number other than zero, and control means responsive to the output signal from said first means adapted to inhibit further arithmetic operations and establish the correct answer of zero.

4. A control circuit for use in floating point multiplication and division operations in a digital computer, said circuit including first and second inputs adapted to be supplied with information signals from the most significant digit of a mantissa of operands involved in a problem, a third input adapted to be supplied with an information signal when a floating point multiplication instruction is prescribed, a fourth input adapted to receive an information signal when a floating point division instruction is prescribed, a first OR circuit, said first and second inputs being connected to said first OR circuit, a first AND circuit, said first OR circuit having an output connected to said first AND circuit, said third input being connected to said AND circuit, a second OR circuit, said first AND circuit having an output connected to said second OR circuit, a second AND circuit, an inverter, said inverter being connected between said second input and said second AND circuit, said first input being connected to said second AND circuit, said fourth input being connected to said second AND circuit, said second AND circuit having an output connected to said second OR circuit, said second OR circuit having an output, means responsive to the output of said second OR circuit for generating pulses adapted to inhibit further arithmetic operations and to establish signals representative of zero where an answer is maintained in the digital computer.

5. The apparatus of claim 4 wherein said last-named means includes a gate circuit, a pulse source connected to said gate circuit, the output of said second OR circuit being connected to said gate circuit, said pulses being passed by said gate when the output of said second OR circuit is at a predetermined level.

6. A comparison circuit for a digital computer for use in combination with programmed operations of multiplication or division to be performed on binary coded operands arranged in a floating arithmetic point format, said comparison circuit including a register having a plurality of storage positions for storing binary coded signals representative of a multiplier or a dividend, a register having a plurality of storage positions for storing binary coded signals representative of a multiplicand or a divisor, means for providing signals representative of a programmed multiplication or division operation to be performed on the corresponding signals stored in each of said registers, first gating circuit means connected to be responsive to the signal representative of the most significant digit in each of said registers in combination with a multiplication signal from said means to provide a signal indicative of a product of zero when either of the most significant digits is zero, second gating circuit means connected to be responsive to the signal representative of the most significant digit in each of said registers in combination with a division signal from said means to provide a signal indicative of a quotient of zero when the most significant digit of the dividend is zero and the most significant digit of the divisor is other than zero, and circuit means connected to each of said gating means to be responsive to the signals indicative of a product or quotient of zero in combination with a computer multiplication or division control signal to provide a signal to prepare the computer for another operation.

References Cited in the file of this patent

UNITED STATES PATENTS

| | | |
|---|---|---|
| 2,658,681 | Palmer et al. | Nov. 10, 1953 |
| 2,895,672 | Dickinson | July 21, 1959 |

OTHER REFERENCES

"Description of a Relay Calculator," by Staff of The Harvard University Computation Laboratory, Harvard University Press. 1949, pp. 106 and 115. Fig. 5.22 on p. 114.